United States Patent [19]
Kaku et al.

[11] Patent Number: 5,470,922
[45] Date of Patent: *Nov. 28, 1995

[54] POLYIMIDE POLYMERIC BLENDS

[75] Inventors: Mureo Kaku, Wilmington, Del.; Robert R. Luise, Boothwyn, Pa.

[73] Assignee: E. I. Du Pont de Nemours and Company, Wilmington, Del.

[*] Notice: The portion of the term of this patent subsequent to Sep. 13, 2011 is disclaimed.

[21] Appl. No.: 241,220

[22] Filed: May 10, 1994

Related U.S. Application Data

[63] Continuation-in-part of Ser. No. 996,256, Dec. 23, 1992, Pat. No. 5,346,969.

[51] Int. Cl.$^6$ .............................. C08L 79/08; C08L 67/03
[52] U.S. Cl. ................ 525/436; 525/422; 525/425; 525/432; 525/169
[58] Field of Search .................................. 525/436, 425, 525/422, 432, 169

[56] References Cited

U.S. PATENT DOCUMENTS

| | | | |
|---|---|---|---|
| 4,614,782 | 9/1986 | Nishizawa | 525/424 |
| 5,157,085 | 10/1992 | Ohta | 525/432 |
| 5,284,903 | 2/1994 | Minnick | 524/538 |
| 5,312,866 | 5/1994 | Tsutsumi | 524/600 |

FOREIGN PATENT DOCUMENTS

| | | |
|---|---|---|
| 0104659 | 4/1984 | European Pat. Off. . |
| 0187416 | 7/1986 | European Pat. Off. . |
| 0278066 | 8/1988 | European Pat. Off. . |
| 3229758 | 10/1991 | Japan . |
| 4-342763A | 11/1992 | Japan . |

*Primary Examiner*—Joseph L. Schofer
*Assistant Examiner*—I. Zemel

[57] ABSTRACT

Polymeric blends of polyimide precursor resins and polyamides or polyesters, preferably in the form of liquid crystal polymers, provide polyimide products with excellent physical characteristics and injection molding capability.

14 Claims, No Drawings

5,470,922

POLYIMIDE POLYMERIC BLENDS

CROSS REFERENCE TO RELATED APPLICATION

This application is a continuation-in-part of U.S. patent application Ser. No. 07/996,256, filed Dec. 23, 1992 now U.S. Pat. No. 5,346,969 and entitled Polyimide Polymeric Blends.

BACKGROUND OF THE INVENTION

Aromatic polyimides have long been known, such as those described in Endrey, U.S. Pat. No. 3,179,631 and Gall, U.S. Pat. No. 3,249,588. Further improved polyimides were more recently discovered by Manwiller and Anton, and described in U.S. Pat. No. 4,755,555. Each of the above patents is hereby incorporated by reference.

Previous polyimides, with their resistance to high temperatures and overall mechanical properties, have found wide acceptance as coatings and fabricated parts used in technically demanding environments such as jet engines, business machines, automotive components and diverse industrial equipment. However, despite the excellent performance characteristics of previously available polyimide compositions, the applicability of these materials has been limited by the intractibility of many polyimides. Specifically, many aromatic polyimides cannot be formed appreciably in their final chemical configuration. Accordingly, the polyamic acid precursor previously was formed into the desired final configuration, such as a film, prior to conversion into the polyimide. In the alternative, formed articles of polyimide have previously been machined into their desired shape.

While these techniques have proved to be satisfactory in the past, it would be desirable to provide a composition which combined the outstanding high temperature performance of aromatic polyimides with injection molding capability.

SUMMARY OF THE INVENTION

The present invention provides a polyimide composition which can be injection molded and which exhibits thermal and physical characteristics comparable to known polyimides.

Specifically, the present invention provides a blend of
(a) about from 99 to 20% by weight of at least one polymer which is melt processable at a temperature of less than about 400° C. and selected from polyamide and polyester and, complementally,
(b) about from 1 to 80% by weight of polyimide precursor resin prepared from at least one aromatic diamine and at least one aromatic dianhydride in which less than about 98% of the polymeric units are converted to polyimide.

DETAILED DESCRIPTION OF THE INVENTION

The present invention is based on the discovery that certain blends of polyimide precursor resin and at least one polyamide or polyester, preferably in the form of liquid crystalline polymer (LCP), provide a unique combination of the properties characteristic of polyimides together with an injection molding capability.

A wide variety of polyimide precursor resins can be used in the present invention. Representative of polyimides which can be used are those prepared from aromatic diamines and dianhydrides as described in the aforementioned Endrey, U.S. Pat. No. 3,179,631 and Gall, U.S. Pat. No. 3,249,588. Certain of those polyimides have been found to be particularly satisfactory in the present invention, namely, those having a rigid polymeric structure. Representative of such rigid polymeric materials are those prepared using pyromellitic dianhydride (PMDA) and oxydianiline (ODA); p-phenylene diamine (PPD) and PMDA; and 3,3'4,4'-biphenyltetracarboxylic dianhydride (BPDA) and PPD. The dianhydride and the aromatic diamine are generally reacted in substantially equimolar quantities. However, excesses of dianhydride or diamine can be used to beneficially modify the properties of the final polyimide. The reaction product of the dianhydride and the aromatic diamine is a polyimide precursor resin, containing polyamic acid which can be thermally or chemically converted to polyimide according to known techniques.

In accordance with the present invention, the polyimide precursor resin is blended with at least one polymer which is melt processable at temperatures of less than about 400° C. Melt processable is used in its conventional sense, that the polymer can be processed in extrusion apparatus at the indicated temperatures without substantial degradation of the polymer. Such polymers include polyamide or polyester. The blending is carried out prior to complete conversion of the polyamic acid moieties to polyimide. The blending should be done when less than about 98% of the polyamic acid units are converted to polyimide, and preferably when less than about 85% of the polyamic acid units are so converted. The percentage of unconverted polyamic acid units in a polyimide precursor resin can be determined using conventional thermogravimetric analysis (TGA).

A wide variety of polyamides or polyesters can be blended with the polyimide precursor resin. For example, polyamides which can be used include nylon 6, nylon 6,6, nylon 610 and nylon 612. Polyesters which can be used include polybutylene terephthalate and polyethylene terephthalate.

The fusible or melt processable polyamide or polyester can be, and preferably is, in the form of a liquid crystal polymer (LCP). The LCPs are generally polyesters, including, but not limited to, polyesteramides and polyesterimides. LCPs are described by Jackson et al., for example, in U.S. Pat. Nos. 4,169,933, 4,242,496 and 4,238,600, as well as in "Liquid Crystal Polymers: VI Liquid Crystalline Polyesters of Substituted Hydroquinones," Contemporary Topics in Polymer Science, 1984, vol 5, pp. 177–208. Still other liquid crystal polymers are described in Calundann, U.S. Pat. No. 4,219,461. The specific LCP used in the present invention is not critical, so long as the basic amide or ester moiety is present.

The polyimide precursor resin and the polyamide or polyester can be blended by any convenient technique, as will be recognized by those skilled in the art, including, for example, conventional mixers and extruders.

After blending, the conversion to the polyimide can be completed. This can be brought about by conventional techniques, most typically the chemical or thermal conversion methods previously used in the art.

The physical properties of the resulting polyimide blend, after forming into the desired final configuration, can often be further improved by heat treatment, using times and temperatures appropriate for the blend components. In general, the heat treating involves exposing the molded polymer blend to an elevated temperature profile approaching but below the melting point of the polyamide or polyester, over a period of about 2–24 hours. The heat treatment can be carried out in air, but preferably under nitrogen. Typical maximum temperatures are about 300° C. One heat treating procedure found to be particularly satisfactory for those blends based on LCPs is that described in Luise, U.S. Pat. No. 4,247,514, hereby incorporated by reference. Heat treatment particularly improves the wear properties of blends based on LCPs over the LCPs themselves.

The present polyimide blends often comprise fillers, to improve wear and frictional characteristics, while retaining, to a large extent, the excellent tensile properties of the polyimides. For example, carbonaceous fillers such as graphite, can be used. Other fillers which can be used with the present polyimide blends include molybdenum disulfide, glass fibers, and tetrafluoroethylene polymers and copolymers. The particular filler or fillers selected will, of course, depend on the effect desired in the final composition, as will be evident to those skilled in the art. It is often convenient to incorporate these fillers into the reaction mixture prior to precipitation and blending with the polyamide or polyester, in quantities of from about 1% by weight of the polymeric blend to about 80%, depending on the filler and the properties desired. Generally, less than about 50% filler is used. The form of the fillers will depend on the function of the filler in the final products. For example, the fillers can be in particulate or fibrous form.

The polymeric blends of the present invention are useful in a wide variety of physical configurations, including, for example, molded articles, films and fibers.

The blends can be injection molded using conventional techniques. This injection molding capability significantly broadens the applicability of the polyimides.

The present invention is further illustrated by the following specific Examples and Comparative Examples, in which parts and percentages are by weight unless otherwise indicated. However, the percent polyamic acid is based on the percentage of polymeric repeat units in the form of polyamic acid as opposed to polyimide.

In these Examples:

Polyimide A is a polymer prepared by reaction of pyromellitic dianhydride and oxydianiline, according to the general procedures of Gall, U.S. Pat. No. 3,249,588, Example 3.

Polyimide B is the same polymer as A, with 15 weight % particulate graphite filler.

Polyimide C is the same polymer as A, with 40 weight % particulate graphite filler.

Polyimide D is a polymer prepared by reaction of pyromellitic dianhydride and oxydianiline, according to the general procedures of Manwiller et al., U.S. Pat. No. 4,755,555. Example 1.

Polyimide E is the same polymer as D, with 10 weight % particulate graphite filler.

Polyimide F is a polymer prepared by reaction of 3,3'4,4'-biphenyltetracarboxylic dianhydride and para-phenylene diamine, according to the same general procedures, and containing 2.5 weight % graphite filler.

Polyimide G is a polymer prepared by reaction of 3,3'4,4'-biphenyltetracarboxylic dianhydride and meta-phenylene diamine, according to the same general procedures, and containing 10 weight % graphite filler.

The polyimides or polyimide precursor resins were blended with varying quantities of polyesters, as shown in the Tables. The blends were generally prepared using a 28 mm twin screw extruder, except for Examples 17 and 19. The extruder was operated with a barrel temperature of 320° C.–330° C. with the die at 330° C. The extruder was equipped with a vacuum port, and a 3/16-inch (0.48 cm) die port. The screw was operated at 150 rpm, to provide extrusion rates of 5–10 pounds (2.3–4.6 kg) per hour. In Examples 17 and 19, the components were batch blended using a Haake mixer at 350° C. for 5–10 minutes.

The polyesters were in the form of LCPs. LCP-A is a copolymer of phenyl hydroquinone, hydroquinone and terephthalic acid in a mole ratio of 42.5:7.5:50. LCP-B is a copolymer of biphenol, hydroquinone, terephthalic acid, 2,6-naphthalene dicarboxylic acid and 4-hydroxy benzoic acid in mole ratios of 9.6:9.6:13.5:5.8:61.5.

Three 1/4"×1/4" pins are cut for each sample from the center edge of 1/8" flex bars. The three pins are mounted on a 1.25" OD circular holder spaced 120 degrees apart, with their parallel axis (longitudinal axis of flex bar) oriented tangential to the 15/16" diameter mounting circle. The pins are loaded at 400 psi axially against a 1.25" OD×5/8" ID steel washer of AISI 1018 carbon steel finished to 15 micro-inch (AA), rotating at 50 fpm velocity, as in a standard thrust bearing wear test. Wear factors obtained from measurements of the wear rate divided by the product of load (P) and velocity (V) at PV=20,000 are summarized below for blends and respective neat resins, in addition to measured static and dynamic friction coefficients.

To convert reported property values to metric units, the indicated values can be multiplied by the following factors:

| | English Unit Multiplication | |
|---|---|---|
| English Unit | Multiplication Factor | Metric Unit |
| Kpsi | 70.24 | kg/cm² |
| ft-lb/in | 5.44 | kg-cm/cm |

CAMPARATIVE EXAMPLES A–I

To provide a basis for comparison, the mechanical properties and wear performance of the substantially fully converted polyimides, polyesters, and blends of the polyimides and polyesters were tested. The results are summarized in Tables 1 and 2 below.

TABLE 1

Mechanical Properties of LCP, and Blends with Polyimide Resin

| Example | Blend Polyester | Composition (wt %) Polyimide | Tensile/Elong. (Kpsi/%) | Flex M (Kpsi) | NIZod (ft-lb/in) | HDT (deg-C.) |
|---|---|---|---|---|---|---|
| A | LCP-A | | 9.9/0.35 | 1788 | 1.18 | 268 |
| B | LCP-A(60) | A (40) | 4.6/1.0 | 736 | 0.33 | 197 |
| C | LCP-A(70) | C (30) | 8.1/0.83 | 1074 | 0.39 | 236 |
| D | LCP-B | | 16.8/1.8 | 1015 | 1.92 | 239 |
| E | LCP-B(90) | A (10) | 18.7/2.0 | 1094 | 2.08 | 240 |
| F | LCP-B(60) | A (40) | 6.8/2.0 | 564 | 0,41 | 203 |

TABLE 2

Wear Performance of LCP and Polyimide Resin

| Example | Polymer | Kw (× 10–10) | Friction of Coefficient Dynamic | Static |
|---------|---------|--------------|---------|--------|
| A | LCP-A | 379,000 | 0.36 | 0.35 |
| D | LCP-B | 205,000 | 0.62 | 0.35* |
| E | LCP-B Blend | 375,000 | 0.50 | 0.38 |
| F | LCP-B Blend | 148,000 | 0.48 | 0.49 |
| G | Polyimide B** | 103 | 0.24 | |
| H | Polyimide G** | 16 | 0.11 | |
| I | Polyimide F** | 16 | 0.10 | |

*Severe noise and vibration.
**Measured at PV = 25,058
(P = 187 psi
V = 134 fpm.)

EXAMPLES 1–8

In Examples 1–8, blends were prepared from a polyimide precursor resin based on polyimide (Pl-F), with varying concentrations of unconverted polyamic acid (PAA). The polyimide precursor resin was blended with LCP-A and LCP-B, in the quantities indicated in Tables 3 and 4. LCP-A was used in Comparative Example A and Examples 1–2. LCP-B was used in Comparative Example B and Examples 3–8.

The mechanical properties of the blend of Example 4 and the polyester of Comparative Example D were tested with and without heat treatment. The heat treatment was carried out at a maximum temperature of 305° C. for a period of about 28 hours under a nitrogen atmosphere. The heat treatment was carried out by heating the samples from room temperature to 200° C. over a period of 2 hours; heating to a temperature of 200°–305° C. for 7.5 hours; holding at 305° C. for 16 hours, and cooling to room temperature over a 2-hour period. The treatment was carried out under nitrogen, with the samples laid on a porous metal tray which was covered with fiberglass cloth.

The test results are summarized in Tables 3, 4, and 5.

TABLE 3

Mechanical Properties of LCP and Blends with Polyimide Precurser Resins

| Example | Blend LCP | Composition (wt %) PI-F | % of Repeat Units | Tensile/Elong. (Kpsi/%) | Flex M (Kpsi) | NIZod (ft-lb/in) | HDT (deg-C.) |
|---------|-----------|-------------------------|-------------------|-------------------------|---------------|------------------|--------------|
| A | 100 | | | 9.9/0.35 | 1788 | 1.18 | 268 |
| 1 | 90 | 10 | 0.2 | 12.3/0.73 | 1591 | 0.53 | 247 |
| 2 | 70 | 30 | 0.2 | 7.1/0.66 | 1192 | 0.43 | 222 |
| D | 100 | | | 16.8/1.8 | 1015 | 1.92 | 239 |
| 3 | 90 | 10 | 1.0 | 9.6/1.6 | 747 | 0.62 | 225 |
| 4 | 70 | 30 | 1.0 | 15.6/2.4 | 934 | 3.40 | 234 |
| 5 | 70 | 30 | 0.37 | 8.4/1.5 | 653 | 0.59 | 231 |
| 6 | 70 | 30 | 0.15 | 6.5/1.2 | 633 | 0.43 | 224 |
| 7 | 70 | 30 | 0.02 | 6.3/1.1 | 751 | 0.56 | 234 |
| 8 | 50 | 50 | 1.0 | 7.2/1.8 | 646 | 0.90 | 236 |

TABLE 4

Mechanical Properties of LCP and Its Blend With Polyimide Precursor Resin After Heat Treatment

| Example | Blend LCP-B | Composition (wt %) PI-F | PAA (% of units) | Heat Treatment | Tensile/Elong. (Kpsi/%) | Flex M (Kpsi) | NIZod (ft-lb/in) | HDT (deg-C.) |
|---|---|---|---|---|---|---|---|---|
| D | 100 | — | — | no | 16.8/1.8 | 1015 | 1.92 | 239 |
|   |     |   |   | yes | 21.6/2.0 | 1020 | 7.80 | 315 |
| 4 | 70 | 30 | 1.0 | no | 15.6/2.4 | 934 | 3.40 | 234 |
|   |    |    |     | yes | 18.6/2.4 | 921 | 4.80 | 316 |

TABLE 5

Wear Performance

| Example | Blend LCP | composition (wt %) PI-F | PAA (% of units) | Kw (× 10−10) | Coefficient of Friction Dynamic | Static |
|---|---|---|---|---|---|---|
| A | 100 |  |  | 379,000 | 0.36 | 0.35 |
| A-HT | 100 |  |  | 95,000 | 0.57 | 0.48 |
| A | 90 | 10 | 0.2 | 15,400 | 0.29 | 0.27 |
| D | 100 |  |  | 205,000 | 0.62 | 0.35 |
| D-HT | 100 |  |  | 54,000 | 0.44 | 0.50 |
| 3 | 90 | 10 | 1.0 | 39,000 | 0.28 | 0.37 |
| 4 | 70 | 30 | 1.0 | 95,000 | 0.39 | 0.49 |
| 4-HT |  |  |  | 780 | 0.28 | 0.18 |
| 5 | 70 | 30 | 0.37 | 1,400 | 0.27 | 0.29 |
| 6 | 70 | 30 | 0.15 | 326 | 0.24 | 0.24 |
| 7 | 70 | 30 | 0.02 | 355 | 0.34 | 0.26 |
| 8 | 50 | 50 | 1.0 | 373 | 0.25 | 0.25 |
| 8-HT |  |  |  | 154 | 0.29 | 0.31 |

EXAMPLES 9–19

In Examples 9–19, the general procedure of Examples 1–8 was repeated, using LCP-B and polyimide precursor resin based on polyimides D and E. The resulting blends were tested as before, and the results summarized in Tables 6 and 7.

TABLE 6

Mechanical Properties

| Example | Blend LCP-B | Composition (wt %) PI | resin | PAA (% of units) | HT | Tensile/Elong. (Kpsi/%) | Flex M (Kpsi) | NIZod (ft-lb/in) | HDT (deg-C.) |
|---|---|---|---|---|---|---|---|---|---|
| 9 | 90 | D | 10 | 1.0 |   | 17.2/2.1 | 882 | 2.10 | 233 |
| 9 |    |   |    |     | X | 18.6/2.1 | 874 | 2.60 | 291 |
| 10 | 80 | D | 20 | 1.0 |   | 13.9/2.3 | 718 | 1.20 | 228 |
| 10 |    |   |    |     | X | 15.4/2.7 | 690 | 1.50 | 284 |
| 11 | 70 | D | 30 | 1.0 |   | 11.1/2.1 | 609 | 0.80 | 221 |
| 11 |    |   |    |     | X | 12.2/2.8 | 573 | 1.10 | 282 |
| 12 | 90 | E | 10 | 1.0 |   | 13.9/2.2 | 793 | 2.80 | 226 |
| 13 | 80 | E | 20 | 1.0 |   | 12.7/2.2 | 744 | 1.33 | 224 |
| 13 |    |   |    |     | X | 13.9/2.2 | 755 | 2.75 | 291 |
| 14 | 70 | E | 30 | 1.0 |   | 7.6/1.6 | 597 | 1.25 | 224 |
| 14 |    |   |    |     | X | 8.5/1.8 | 637 | 2.51 | 279 |
| 15 | 70 | E | 30 | 0.79 |   | 11.1/2.7 | 634 | 1.63 | 230 |
| 15 |    |   |    |     | X | 10.3/2.4 | 620 | 2.48 | 316 |
| 16 | 70 | E | 30 | 0.14 |   | 8.3/1.1 | 534 | 0.93 | 219 |
| 17* | 63.5 | E | 36.5 | 0.14 |   | 5.1/1.7 | 439 | 0.30 | 192 |
| 17* |      |   |      |      | X |         | 404 | 0.48 | 238 |
| 18 | 60 | E | 40 | 1.0 |   | 5.1/1.2 | 462 | 0.82 | 207 |
| 18 |    |   |    |     | X | 5.6/1.6 | 478 | 1.62 | 262 |
| 19* | 50 | E | 50 | 0.79 |   | 4.8/1.5 | 421 | 0.30 | 184 |
| 19* |     |   |    |      | X |         | 402 | 0.45 | 234 |

*batched blended

TABLE 7

| | | Wear Performance | | | | | |
|---|---|---|---|---|---|---|---|
| | Blend | Composition (wt %) | | PAA | Kw | Coefficient of Friction | |
| Example | LCP-B | PI | resin | (% of units) | (× 10−10) | Dynamic | Static |
| D | 100 | | | | 205,000 | 0.62 | 0.35 |
| D-HT | | | | | 54,000 | 0.44 | 0.50 |
| 9 | 90 | D | 10 | 1.00 | 488,970 | 0.39 | 0.40 |
| 10 | 80 | D | 20 | 1.00 | 48,390 | 0.44 | 0.33 |
| 11 | 70 | D | 30 | 1.00 | 12,840 | 0.40 | 0.47 |
| 12 | 90 | E | 10 | 1.00 | 145,700 | 0.37 | 0.42 |
| 13 | 80 | E | 20 | 1.00 | 59,950 | 0.39 | 0.39 |
| 14 | 70 | E | 30 | 1.00 | 1,830 | 0.30 | 0.28 |
| 15 | 70 | E | 30 | 0.79 | 11,900 | 0.33 | 0.33 |
| 15-HT | | | | | 290 | 0.29 | 0.19 |
| 16 | 70 | E | 30 | 0.14 | 1,800 | 0.31 | 0.31 |
| 17 | 63.5 | E | 36.5 | 0.14 | 68,400 | 0.38 | 0.34 |
| 17-HT | | | | | 2,780 | 0.40 | 0.39 |
| 18 | 60 | E | 40 | 1.00 | 2,830 | 0.32 | 0.35 |

We claim:

1. A polymeric blend comprising
   (a) about from 99 to 20% by weight of at least one polyester polymer which is melt processible at a temperature of less than about 400° C. and, complementally,
   (b) about from 1 to 80% by weight of polyimide precursor resin prepared from at least one aromatic diamine and at least one aromatic dianhydride in which less than about 98% of the polymeric units are converted to polyimide.

2. A polymeric blend of claim 1 wherein the polyester is a liquid crystal polymer.

3. A polymeric blend of claim 1 wherein less than about 85% of the polymeric units in the polyimide precursor resin are converted to polyimide.

4. A polymeric blend of claim 3 wherein less than about 40% of the polymeric units in the polyimide precursor resin are converted to polyimide.

5. A polymeric blend of claim 1 further comprising at least about 1%, by weight of the polymeric blend, of filler.

6. A polymeric blend of claim 5 wherein the filler is in particulate form.

7. A polymeric blend of claim 6 wherein the filler consists essentially of graphite.

8. A polymeric blend of claim 1 wherein the polyimide precursor resin is the reaction product of pyromellitic dianhydride and oxydianiline.

9. A polymeric blend of claim 1 wherein the polyimide precursor resin is the reaction product of pyromellitic dianhydride and p-phenylene diamine.

10. A polymeric blend of claim 1 wherein the polyamide precursor resin is the reaction product of 3,3'4,4-biphenyltetracarboxylic dianhydride and para-phenylene diamine.

11. A polymeric blend of claim 1 which has been heat treated at an elevated temperature for a period of about 2–24 hours.

12. A polymeric blend of claim 2 wherein the liquid crystal polymer is a polyesteramide or polyesterimide.

13. A polymeric blend of claim 5 wherein the filler consists essentially of polytetrafluoroethylene.

14. A polymeric blend of claim 2 which has been heat treated at an elevated temperature for a period of about 2–24 hours.

* * * * *